United States Patent
Treptow et al.

(10) Patent No.: US 10,126,410 B2
(45) Date of Patent: Nov. 13, 2018

(54) DETERMINATION OF AN ELEVATION MISALIGNMENT ANGLE OF A RADAR SENSOR OF A MOTOR VEHICLE

(71) Applicant: Robert Bosch GmbH, Stuttgart (DE)

(72) Inventors: Andre Treptow, Vaihingen an der Enz (DE); Dirk Bechler, Karlsruhe (DE); Goetz Kuehnle, Hemmingen (DE); Volker Gross, Ditzingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 435 days.

(21) Appl. No.: 14/891,617

(22) PCT Filed: Apr. 1, 2014

(86) PCT No.: PCT/EP2014/056515
§ 371 (c)(1),
(2) Date: Feb. 17, 2016

(87) PCT Pub. No.: WO2014/187597
PCT Pub. Date: Nov. 27, 2014

(65) Prior Publication Data
US 2016/0161597 A1   Jun. 9, 2016

(30) Foreign Application Priority Data
May 23, 2013   (DE) .................. 10 2013 209 530

(51) Int. Cl.
*G01S 7/40* (2006.01)
*G01S 13/42* (2006.01)
(Continued)

(52) U.S. Cl.
CPC .......... *G01S 7/4026* (2013.01); *G01S 13/424* (2013.01); *G01S 13/931* (2013.01); *G01S 13/345* (2013.01);
(Continued)

(58) Field of Classification Search
CPC .. G01S 13/345; G01S 13/424; G01S 13/4445; G01S 13/4454; G01S 13/931; G01S 2007/4034; G01S 7/4026
(Continued)

(56) References Cited

U.S. PATENT DOCUMENTS 5,784,023 A * 7/1998 Bluege ................. G01S 7/4815
342/104
6,026,353 A * 2/2000 Winner ................. G01S 7/4026
342/70
(Continued)

FOREIGN PATENT DOCUMENTS

DE 19748604 A 5/1999
DE 10 2008 054 579 6/2010
(Continued)

*Primary Examiner* — Timothy A Brainard
(74) *Attorney, Agent, or Firm* — Norton Rose Fulbright US LLP; Gerard Messina (57) ABSTRACT

A method for identifying an elevation misalignment angle of a radar sensor of a vehicle, including: identifying elevation angles of radar object localizations with reference to a coordinate system of the radar sensor, an elevation angle of a radar object localization being respectively identified based on radar echoes that are obtained with at least two antenna directional characteristics that differ in an elevation direction; and identifying an elevation misalignment angle based on an occurrence frequency distribution of the elevation angles of at least some of the radar object localizations; and a radar sensor for vehicles having an evaluation device embodied to carry out the method.

9 Claims, 3 Drawing Sheets

(51) Int. Cl.
*G01S 13/93* (2006.01)
*G01S 13/34* (2006.01)
*G01S 13/44* (2006.01)

(52) U.S. Cl.
CPC ....... *G01S 13/4445* (2013.01); *G01S 13/4454* (2013.01); *G01S 2007/4034* (2013.01)

(58) Field of Classification Search
USPC .................................................. 342/173, 174
See application file for complete search history.

(56) References Cited

U.S. PATENT DOCUMENTS

| | | | |
|---|---|---|---|
| 6,556,166 B1 | 4/2003 | Searcy et al. | |
| 2008/0016963 A1 | 1/2008 | Watanabe | |
| 2011/0156955 A1* | 6/2011 | Jeong | G01S 13/931 |
| | | | 342/359 |
| 2012/0235851 A1* | 9/2012 | Park | G01S 7/4026 |
| | | | 342/70 |

FOREIGN PATENT DOCUMENTS

| | | |
|---|---|---|
| DE | 10 2009 029 291 | 3/2011 |
| DE | 199 37 723 | 3/2011 |
| DE | 10 2011 079 522 | 1/2013 |

* cited by examiner

DETERMINATION OF AN ELEVATION MISALIGNMENT ANGLE OF A RADAR SENSOR OF A MOTOR VEHICLE

FIELD OF THE INVENTION

The present invention relates to a method for identifying an elevation misalignment angle of a radar sensor of a vehicle, in particular of a motor vehicle.

BACKGROUND INFORMATION

Radar sensors are increasingly being used in motor vehicles for safety-relevant functions. The identification of an elevation angle of a localized object is of increasing importance in this context. For example, information for classifying the object as one that can or cannot be driven over can be obtained from an elevation angle and a distance of a localized object. If the radar sensor is misaligned in an elevation direction, this can negatively affect the reliability with which objects are classified. A determination of a horizontal angle of detected radar objects can, however, also be negatively affected by a radar sensor that is misaligned in an elevation direction, if the antenna diagram of the antennas which is utilized for evaluation deviates from the antenna diagram that is effective in the actual elevation direction.

Patent document DE 10 2011 079 522 A1 discusses a method in which a misalignment angle of the radar sensor in an elevation direction is identified on the basis of the characteristic, dependent on the angular alignment of the radar sensor in an elevation direction, of a ground clutter signal received by the radar sensor.

Patent document DE 199 37 723 C2 discusses a method in which received rays reflected from a radar target are compared with antenna diagrams that are associated with different misalignments at intervals of 0.5°, and a misalignment of the radar sensor is inferred from that comparison. By averaging over the elevation angles stored in many measurement cycles, the erroneous angle most often stored is identified as an angle for an elevation angle misalignment of the radar sensor.

Patent document DE 10 2008 054 579 A1 discusses a method in which a vertical misalignment of a radar sensor is identified on the basis of how well a signal reflected from a radar target matches a sensor profile for the horizontal angle which indicates an aligned radar sensor.

SUMMARY OF THE INVENTION

An object on which the invention is based is that of enabling more accurate and more reliable automatic detection of a misalignment of a radar sensor in an elevation direction.

This object is achieved according to the present invention by a method for identifying an elevation misalignment angle of a radar sensor of a vehicle, having the steps of:
identifying elevation angles of radar object localizations with reference to a coordinate system of the radar sensor, an elevation angle of a radar object localization being respectively identified based on radar echoes that are obtained with at least two antenna directional characteristics that differ in an elevation direction; and
identifying an elevation misalignment angle based on an occurrence frequency distribution of the elevation angles of at least some of the radar object localizations.

The antenna directional characteristics can differ, for example, in terms of a different received power profile and/or in terms of the phase position of a received radar signal in an elevation direction.

The elevation angle of a radar object localization may be respectively determined based on radar echoes that are obtained with at least two antenna directional characteristics that differ in an elevation direction, and based on an elevation angle dependence of the differences in the antenna directional characteristics.

In the identification of the elevation angle of a radar object localization in an elevation angle range, the elevation angle may be identified based on a difference in the antenna directional characteristics, within the elevation angle range, that is unambiguously dependent on the elevation angle.

Because radar echoes that are obtained with at least two antenna directional characteristics that differ in an elevation direction are used to identify a respective elevation angle of a radar object localization, a direct and very accurate estimate of an elevation angle can be made. Depending on the elevation antenna characteristic of the radar sensor, in the simplest case the elevation misalignment angle can be identified directly from the occurrence frequency of the identified elevation angles of the radar object localizations, as the negative of the angular position of the maximum of the occurrence frequency distribution. For maximally accurate evaluation, it is advantageous if the condition that, as a statistical average, the principal variance centers of the radar object localizations that are used are located substantially at the installation height of the radar sensor, is met to the greatest extent possible, for example by way of a corresponding sensing region of the radar sensor and/or by way of a selection of the object localizations used to create the occurrence frequency distribution.

Advantageous embodiments and refinements of the invention are evident from the dependent claims.

Only radar object localizations that exhibit a minimum signal to noise ratio and/or a minimum backscatter intensity, also called "radar cross section" (RCS), may be used for the occurrence frequency distribution. The backscatter intensity can be calculated, by way of the object distance of a radar object localization, from the signal strength and thus from the signal to noise ratio. Radar object localizations affected by greater uncertainty can thus be left unconsidered, in particular random localizations located in the noise range.

In addition to the previously recited reliability criteria of the minimum signal to noise ratio and/or the minimum backscatter intensity, further reliability criteria based on features of the radar object localizations are advantageous for selecting the radar object localizations for the occurrence frequency distribution. For example, only radar object localizations that meet one, or a predefined combination, of the following reliability criteria can be used for the occurrence frequency distribution:
the radar object localizations are restricted to a distance range, for example exhibit a minimum distance; it is thereby possible to ensure that a target can be regarded as a point target;
the radar object localizations are restricted to an azimuth angle range, for example to an azimuth angle range around the optical axis of the radar sensor; it is thereby possible, for example, to decrease the influence of traffic signs at the roadside on the creation of the occurrence frequency distribution;
the elevation angle identified for the respective radar object localization, and/or an azimuth angle identified for the radar object localization, were identified by comparing at least one measured radar signal with at least one stored reference signal having a minimum comparison quality; unreliable radar object localizations, for example situations with a guardrail reflection, can thus be excluded from creation of the occurrence frequency distribution;

the radar object localizations relate to a moving radar target, i.e. not a stationary target; this criterion allows the influence of radar objects that are not vehicles to be decreased.

In the method, after an identification of a elevation misalignment angle with subsequent identifications of elevation angles of radar object localizations, a correction of the elevation angles as a function of the identified elevation alignment angle may be accomplished, in which correction an expected multipath propagation of the radar signals due to reflection from the ground is considered. Consideration of a multipath propagation due to ground reflection makes it possible, depending on the elevation antenna characteristic of the radar system, to reduce or eliminate any systematic error in the identification of the elevation angle, especially with a radar sensor misaligned obliquely downward.

An exemplifying embodiment is explained in further detail below with reference to the drawings.

DETAILED DESCRIPTION

Figure 1:
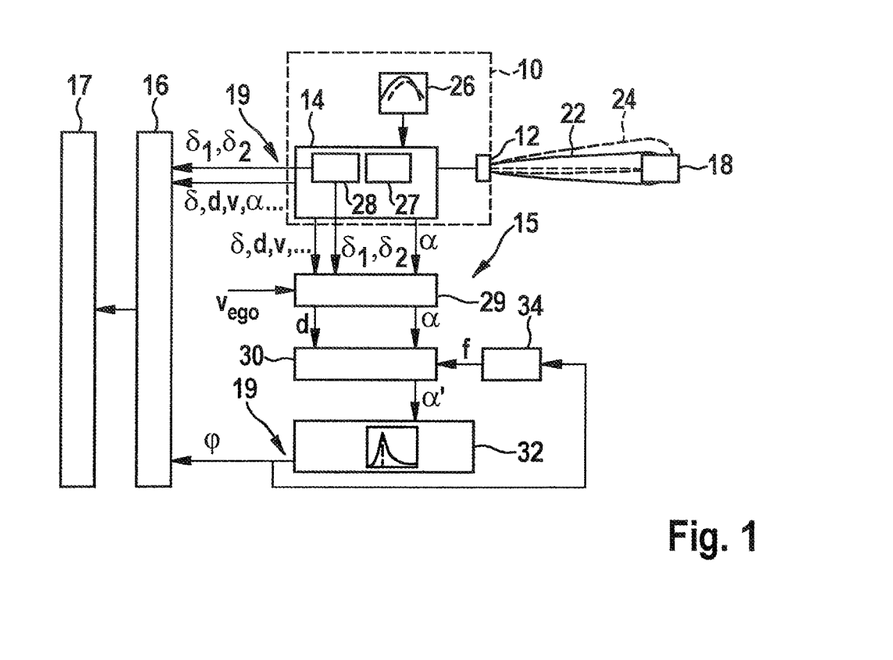
FIG. 1 is a schematic block diagram of an FMCW radar system.

FIG. 1 schematically shows an azimuth angle-resolving radar sensor 10 for a motor vehicle, having an antenna assemblage 12 and a control and evaluation device 14 as well as an evaluation device 15 for identifying an elevation misalignment angle φ of radar sensor 10. An evaluation unit 16 for object detection based on localization data, and a driving assistance device 17, are also shown.

Radar sensor 10 is an FMCW radar sensor in which the frequency of a transmitted radar signal is periodically modulated, in particular in the form of at least one frequency ramp, for example four ramps per measurement cycle. Antenna assemblage 12 encompasses several antenna elements having different directional characteristics, which permit identification of an azimuth angle of a received radar signal.

Control and evaluation device 14 is embodied, in a manner known per se, to apply control to an oscillator of radar sensor 10 and to evaluate the radar signals received by antenna assemblage and identify localization data of sensed radar objects 18, for example based on amplitudes and phases of peaks of baseband signals. The localization data, which encompass for a localized radar object 18, for example, an azimuth angle δ, a distance d, a relative speed v with respect to the own vehicle, and an elevation angle α, are made available via an interface 19 and are conveyed to evaluation unit 16 which carries out object detection and object tracking, and to driving assistance device 17, for example a separation controller and/or an emergency braking assistant.

Radar sensor 10 is embodied to determine the elevation angle α of a radar object localization based on radar echoes that are obtained with two antenna directional characteristics 20, 21 (FIG. 2), differing in terms of elevation direction, of antenna assemblage 12. Antenna assemblage 12 can encompass, for example, two transmitting or receiving antennas having different principal directions of action in an elevation direction. FIG. 1 schematically shows a radar lobe 22 of a main antenna of antenna assemblage 12 using a solid line, and a radar lobe 24 of a second antenna using a dashed line. The principal direction of action of the second antenna is, for example, directed upward with respect to the principal direction of action of the main antenna by an amount equal to a fixed angle value.

Figure 2:
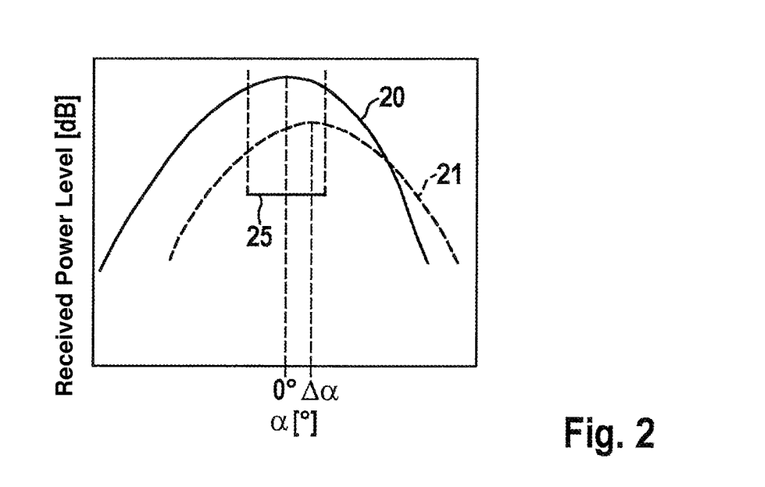
FIG. 2 schematically depicts an elevation antenna diagram of two antennas of the radar system.

FIG. 2 schematically shows the differing antenna directional characteristics 20, 21 in the form of an antenna diagram in which the received power level, depicted in dB, is plotted against the elevation angle α, based on a sensor coordinate system of radar sensor 10. The main sensitivity (direction) of the main antenna, corresponding to radar lobe 22, is located e.g. at an elevation angle of 0°. The second antenna has a main sensitivity direction at an elevation Δα that deviates, for example, by a few degrees from the main sensitivity direction of the main antenna.

Antenna directional characteristics 20, 21 are stored, for example for at least one fixed azimuth angle of 0°, in a memory 26. By comparing the power levels of the radar echoes obtained with the different antenna characteristics 20, 21 it is possible to infer unambiguously from the measured power levels, in an unambiguity region 25 of the elevation angle, the elevation angle α of the localized radar object 18, so that a direct measurement of the elevation angle α is possible.

Control and evaluation device 14 encompasses a single-target angle estimator 27 that is configured to identify, for each frequency ramp of a measurement cycle, an azimuth angle δ of a radar echo. For example, normalized amplitudes and phases of peaks of the baseband signals are calibrated with corresponding antenna diagrams for the antenna elements of antenna assemblage 12, so that the azimuth angle δ of the localized objects 18 can be identified on the basis of a known angle dependence of the amplitudes and phases. This is done by searching a one-dimensional search space (i.e. one calculated as a function of angle) of amplitude differences and phase differences in order to find a correlation between the measured signal and a signal expected for an angle. A peak in the correlation then characterizes the most probable value of the azimuth angle δ.

Control and evaluation device 14 further encompasses a multiple-target estimator 28 that is configured to identify, for at least one frequency ramp in a measurement cycle, at least two azimuth angles $δ_1$, $δ_2$ of a radar echo and to recognize a multiple-target situation if the object reflection can be associated with at least two radar objects 18 at different azimuth angle positions. This is done by searching, for example, a two-dimensional search space (i.e. one calculated as a function of a first angle and a second angle) in order to find a correlation between the measured signal and a signal expected for a combination of two angles.

For example, the multiple-target estimator can be configured to recognize a multiple-target reflection only when the radar echo can be associated with at least two radar objects 18 at different angular positions at one distance d and one relative speed v. For example, multiple-target estimator 28 can be configured to recognize a multiple-target situation if, in a measurement cycle of FMCW radar sensor 10 encompassing several different frequency ramps, respective radar echoes can be associated with at least two radar objects 18 at different angular positions for one distance d and one speed v. In other words, the relevant radar echoes are not separable as to distance d and speed v on any of the frequency ramps of the measurement cycle. Recognition of a multiple-target situation is known per se and is therefore not described further here.

Control and evaluation device 14 is configured to recognize a situation of superimposed echoes in one peak of a discrete frequency spectrum of the baseband signal obtained in a frequency ramp, based on deviations of the peak shape from a peak shape expected for a single target. Such peak superimpositions can be recognized, for example, in accordance with the method indicated in EP 2 182 380 A1.

The localization data ascertained for each radar object localization are outputted by control and evaluation device 14 to a selection device 29, which selects the radar object localizations, based on the localization data, according to whether they meet specific reliability criteria. The selected radar object localization data, in particular the elevation angle $\alpha$ and the distance d, are conveyed from selection device 29 to a ground reflection correction device 30.

Ground reflection correction device 30 optionally carries out a correction of the elevation angles $\alpha$ and conveys a corrected elevation angle $\alpha'$ to a unit 32 for creating an elevation angle histogram. Unit 32 is configured, in a manner explained in more detail below, to create a histogram of the elevation angles of the selected radar object localizations and to ascertain therefrom an estimated value for an elevation misalignment angle $\phi$. The elevation misalignment value $\phi$ is, for example, likewise outputted via an interface 19 to the driving assistance device.

Also determined from the elevation misalignment angle $\phi$, by way of a characteristic curve 34 stored in evaluation device 15, is a ground reflection correction value f that is used by ground reflection correction device 30 to correct the elevation angle $\alpha$.

Figure 3:
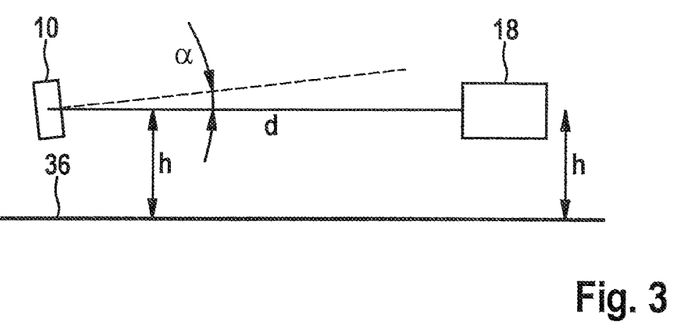
FIG. 3 schematically depicts a situation with a radar sensor misaligned in an elevation direction.

FIG. 3 schematically shows a situation with a radar sensor 10 that is misaligned in an elevation direction. Radar sensor 10 is disposed on the own motor vehicle at an installation height h. A radar object 18 is localized at the same height h above roadway 36 at a distance d. The elevation angle $\alpha$ identified by control and evaluation device 14 is, for example, $\alpha=-2°$ when radar sensor 10 is misaligned upward by an angle of $+2°$ with respect to the horizontal.

Assuming that the great majority of radar object localizations relate to radar objects 18 that are located at the same height as radar sensor 10, a histogram of the measured elevation angles $\alpha$ over an extended period of time shows a maximum at an elevation angle location $-\phi$ that corresponds to the negative of the elevation misalignment angle $\phi$. In the example described, radar sensor 10 has a relatively wide sensing range in an azimuth direction and in an elevation direction. In order to achieve general validity of the assumption regarding the height h of the localized objects 18, selection device 29 is configured to select radar object localizations for creating the histogram. A selection can be made, for example, on the basis of several reliability criteria that must all be met in order for a radar object localization to be used.

Figure 4:
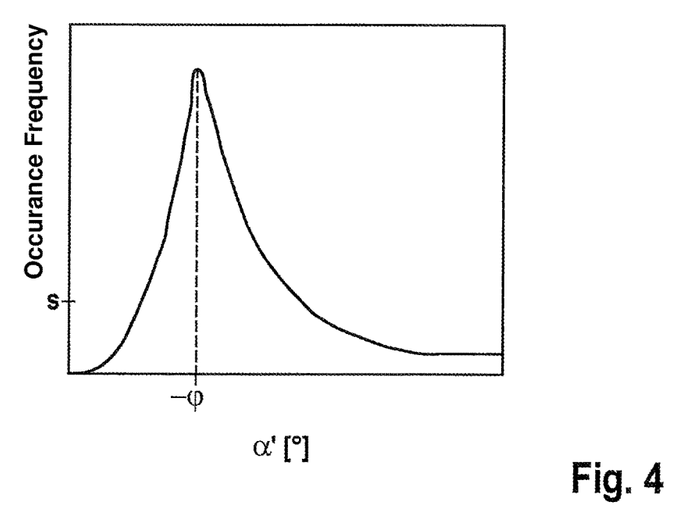
FIG. 4 schematically depicts a diagram of a histogram, obtained in the situation according to FIG. 3, of the elevation angles.

FIG. 4 schematically shows, for the situation shown in FIG. 3 of a radar sensor 10 misaligned, for example, $+2°$ upward, a histogram of elevation angles obtained in the context of a two-hour measurement trip, the following reliability criteria having been used for selection:

According to a first reliability criterion, the distance d of the object localization is within a distance region starting at a minimum distance. The latter is selected so that it can be assumed that a vehicle is sensed as a point target.

According to a further reliability criterion, the identified azimuth angle $\delta$ exhibits a minimum quality that allows the localized radar object 18 to be regarded as a point reflector for identification of the localization data. A value for a quality of an angle identification can be identified, for example, based on the degree of agreement between obtained radar echo signals and antenna diagrams stored in control and evaluation device 14.

According to a further reliability criterion, the radar object localization exhibits a signal to noise ratio for the received power level which is greater than or equal to a minimum value. Localizations of irrelevant objects can thereby be excluded.

According to a further reliability criterion, those radar object localizations for which multiple-target estimator 28 associates two or more azimuth angles $\delta_1$, $\delta_2$ with radar objects 18 at one distance d and one relative speed v, and thus recognizes a multiple-target situation, are excluded by selection device 29 from use for the histogram. In other words, the only radar object localizations used for the occurrence frequency distribution are those for which the radar echo is associated with only one radar object at one azimuth angle position. It is thereby possible to prevent any erroneous elevation angles, due to constructive or destructive interference of the various radar reflections, from being incorporated into the occurrence frequency distribution.

According to a further reliability criterion, those radar object localizations for which a situation of superimposed radar echoes in an associated peak is recognized by control and evaluation device 14 are excluded by selection device 29 from use for the histogram. The use, for the occurrence frequency distribution, only of radar object localizations for which no peak superimposition is recognized allows the exclusion of object localizations for which the reliability of the object localization can be called into question due to radar echo interference.

Thanks to the reliability criteria described, the radar object localizations selected by selection device 29 are principally those having pertinent elevation angles $\alpha$ and distances d that presumably relate to other vehicles and can be treated as point targets.

Selection device 29 can also be embodied to utilize further reliability criteria. For example, selection device 29 can employ the own speed $v_{ego}$ of the own vehicle, for example, in order to exclude stationary targets, or in order to reproduce radar object localizations only when the own vehicle is moving or is at a minimum speed. A disproportionately strong influence of individual radar targets on the occurrence frequency distribution in static traffic situations can thus be avoided.

In the situation shown by way of example in FIG. 3, with a radar sensor misaligned upward, the ground 36 (i.e. the roadway) can already, depending on the antenna diagram, have no influence on the measured elevation angle $\alpha$ of radar objects 18 at the same height h as radar sensor 10. In this case ground reflection correction device 30 conveys the elevation angle $\alpha$ to unit 32, without modification, as a corrected elevation angle $\alpha'$.

Unit 32 creates a sliding-time histogram from the elevation angles $\alpha'$ obtained for the radar object localizations. This can be implemented, for example, by way of a filter having a time-limited memory. The histogram is created, for example, in the form of an occurrence frequency distribution over a value range of the elevation angles α'. The histogram contains no distance information, but only angle information.

Unit 32 is configured, for example, to identify the elevation angle position –φ of the maximum of the occurrence frequency distribution, and to output the negative of that value as the relative misalignment angle φ, if the maximum of the occurrence frequency distribution reaches or exceeds a threshold value s. The threshold value s is selected so that the ascertained alignment angles are reliable. In typical traffic situations only a few minutes of driving time, for example, can be sufficient for this.

Figure 5:
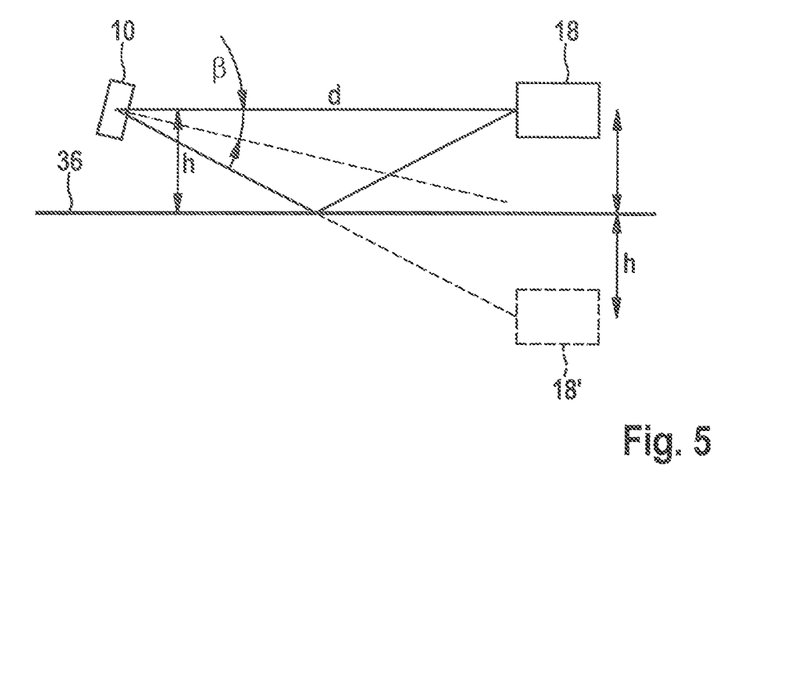
FIG. 5 is a schematic depiction to explain a correction angle in a situation with ground reflection.

Whereas in the situation shown in FIG. 3 no influence from roadway 36 on the identification of the elevation angles α is normally to be expected, in a situation depicted schematically in FIG. 5, with a radar sensor 10 misaligned downward, a substantial portion of the received power is received via multipath propagation with reflection at the ground 36. For example, if the direct propagation path in a horizontal direction constitutes as large a proportion of the received power level as does the propagation path with ground reflection, an elevation angle distribution with a maximum at the height of ground 36 at the distance d would be obtained. The propagation path with reflection corresponds to a mirror object 18' at a height h below the roadway. The intensity with which the ground reflection influences the measured elevation angle α differs depending on the intensity of the ground reflection and depending on the elevation antenna diagram, i.e. the antenna directional characteristic in an elevation direction. This influence is taken into account by ground reflection correction device 30 in the following manner:

The elevation misalignment angle φ is identified, as described, from the location, ascertained by unit 32, of the occurrence frequency maximum of the histogram. A ground reflection correction value f is identified as a function of the identified elevation misalignment angle φ, in accordance with the characteristic curve shown by way of example in FIG. 6. In the example shown, above an upper correction threshold $φ_+$ the correction value f=0. This corresponds to situations with a radar sensor 10 misaligned relatively far upward, for which a ground reflection correction is not necessary. Below the upper correction threshold $φ_+$, a ground reflection correction takes place. According to the characteristic curve shown in FIG. 6, the value of the correction value f, and thus the extent of the correction, increases substantially continuously until, at a lower correction threshold $φ_-$, the correction value f assumes a maximum f=1 so that full correction of ground reflection takes place here.

The ground reflection correction is accomplished by correcting the measured, apparent elevation angle α for an object distance d by adding a correction angle β that scales with f. The correction angle β is identified, for example, as β=arctan (h/d). The extent to which the identified elevation angle α is corrected depends on the distance d of the object localization. For an elevation misalignment angle α below the lower correction threshold of 0°, full angle correction is accomplished by adding the full correction angle β to the apparent elevation angle α of the subsequent radar object localizations. In the situation shown in FIG. 5, this corresponds to raising the apparent object height from the roadway level to the actual object height h.

Figure 6:
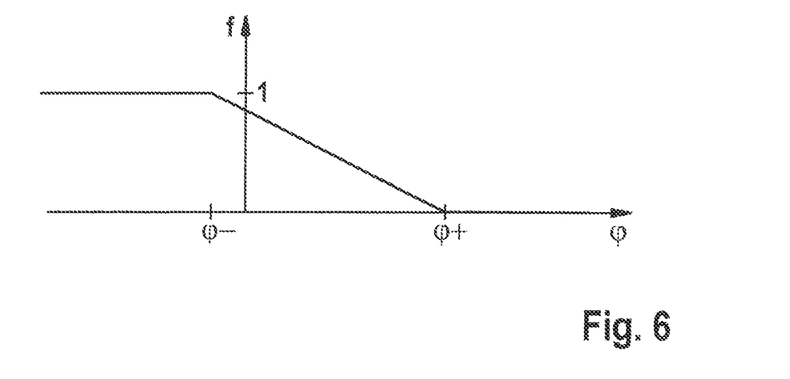
FIG. 6 schematically depicts the elevation angle-dependent profile of a characteristic curve for a correction value for the ground reflection.

For elevation misalignment angles φ in the range between the correction thresholds, a correction is made only over a portion of the angle β corresponding to the factor f.

In the example shown, full correction of the elevation angles α, corresponding to f=1, also already occurs with an accurately horizontally aligned radar sensor 10.

The characteristic curve of the ground reflection correction value f can, for example, be identified or calibrated, for example using a measurement trip, or it can be calculated based on an antenna diagram and expected ground reflection properties.

If a change in the misalignment angle of radar sensor 10 in an elevation direction has taken place, for example due to an impact on the own vehicle e.g. caused by minor parking damage, a maximum in the sliding histogram will build up at a different angle position –φ as a result of the subsequent radar object localizations, and that maximum will ultimately be recognized as an occurrence frequency maximum. A new elevation misalignment angle φ is then ascertained, and an adaptation of the ground reflection correction value f is accomplished as applicable. The implementation of the sliding histogram, in particular the time period within which a new occurrence frequency maximum overrides the remaining magnitude of the previous maximum in typical traffic situations, can be selected variably. A compromise must be struck here between rapidity and the stability with which a new alignment angle is ascertained. With sufficiently high dynamics, for example, an abruptly occurring misalignment can be recognized in two to three minutes.

The above-described ground reflection correction makes it possible to recognize the elevation misalignment angle φ with high accuracy for both a positive and a negative elevation angle misalignment direction of radar sensor 10, and to identify the value of the angle.

Thus not only can a misalignment be reliably recognized, but the elevation misalignment angle φ that is ascertained can be used by a driving assistance device to correct the localization data. The ground reflection correction allows systematic estimation errors in vertical misalignment recognition to be avoided. The above-described reliability criteria ensure that the assumption that the object height of the radar object localizations used to create the histogram is identical to the installation height of radar sensor 10, is substantially correct. The identified elevation misalignment angle φ can thus also be a basis for safety-relevant driving assistance devices 17 in which a radar object 18 is classified as one that can or cannot be driven over, for example based on the measured elevation angle α and in consideration of the identified elevation misalignment angle φ. Optionally, a fault signal is outputted if value limits for the elevation misalignment angle are exceeded.

It is particularly advantageous that the vertical misalignment of radar sensor 10 can be accomplished automatically, and that implementation can be effected by realizing evaluation device 15 in the form of processing procedures of a data processing unit with no further hardware components. Evaluation device 15 can be integrated into control and evaluation device 14. The simplicity of the calculation operations to be carried out in order to create the histogram and identify the location of the maximum is also advantageous. It is furthermore advantageous that the elevation misalignment angle is recognized and identified directly on the basis of the localization data measured with reference to the coordinate system of radar 10. Assuming that on average the reflection points of the localized objects being used are located at sensor height, that recognition and identification is thus independent of assumptions regarding the radar object which are made, for example, only at a higher level of object tracking in evaluation device 16. Overall, improved reliability and robustness are achieved in terms of the detection performance of radar sensor 10.

Direct measurement of the elevation angle α of a radar object localization can be accomplished in various ways based on radar echoes that are obtained with at least two antenna directional characteristics differing in an elevation direction. In accordance with DE 10 2010 064 348 A1, for example, radar sensor 10 can have an antenna assemblage to which control can be applied by way of a control device in such a way that it has a time-varying directional characteristic. For example, the antenna assemblage can have at least two groups of antenna elements that differ in terms of their direction of action in elevation, and that are activated and deactivated in periodic alternation.

In accordance with DE 10 2009 047 561 A1 radar sensor 10 can also have at least two antenna element rows that, with their pertinent phase centers, are displaced with respect to one another in a vertical direction, a beam-shaping cylindrical lens being disposed and embodied in such a way that the antenna radiation proceeding from the at least two antenna element rows is respectively focused at different vertical angles.

Radar sensor 10 can also have an antenna assemblage 12 in accordance with the planar antenna device described in DE 10 2009 046 491 A1, in which an elevation angle, or an estimated value of the elevation angle, of a sensed object is identifiable. The elevation angle or the estimated value of the elevation angle can be identifiable, for example, by way of a phase difference between two sub-columns of an antenna column.

In order to identify an elevation angle, radar sensor 10 can also be embodied in accordance with the radar sensor apparatus described in DE 10 2009 029 503 A1.

Radar sensor 10 can also have an antenna assemblage 12 corresponding to the planar antenna device described in DE 10 2009 029 291 A1.

While a multiple-target estimator for directional angles in the form of azimuth angles has been described above, a multiple-target estimator can be provided in general for multiple-target situations relating to directional angles in the form of azimuth angles and/or elevation angles.

What is claimed is:

1. A method for identifying an elevation misalignment angle of a radar sensor of a vehicle, the method comprising:
   identifying, via a control and evaluation device and a radar sensor, elevation angles of radar object localizations with reference to a coordinate system of the radar sensor, wherein an elevation angle of a radar object localization is respectively identified based on radar echoes that are obtained with at least two antenna directional characteristics that differ in an elevation direction; and
   identifying, via an evaluation device, the elevation misalignment angle based on an occurrence frequency distribution of the elevation angles of at least some of the radar object localizations;
   wherein the radar sensor encompasses a multiple-target estimator that is configured to recognize a multiple-target situation and to identify at least two directional angles of a radar echo if the radar echo can be associated with at least two radar objects at different angular positions, and wherein only radar object localizations for which the multiple-target estimator does not recognize a multiple-target situation are used for the occurrence frequency distribution.

2. The method of claim 1, wherein after an identification of the elevation misalignment angle with subsequent identifications of elevation angles of radar object localizations, a correction of the elevation angles as a function of the identified elevation alignment angle is performed, an expected multipath propagation of the radar signals due to reflection from the ground being considered in the correction.

3. The method of claim 1, further comprising:
   identifying a ground reflection correction value as a function of the identified elevation misalignment angle;
   wherein the ground reflection correction value is used in subsequent identifications of elevation angles of radar object localizations to correct the identified elevation angle so as to take into consideration an expected multipath propagation of the radar signals due to reflection from the ground.

4. The method of claim 1, wherein after determining an elevation misalignment angle, performing a correction of the elevation angles in subsequent identifications of elevation angles of radar object localizations, wherein a correction value is identified based on the identified elevation misalignment angle, and the elevation angle at an object distance is corrected by adding a correction angle scaled with the correction value, and wherein the correction angle is identified in accordance with the equation $\beta=\arctan(h/d)$, h corresponding to the installation height of the radar sensor.

5. The method of claim 1, wherein only radar object localizations that exhibit a reduced signal to noise ratio and/or a reduced backscatter intensity are used for the occurrence frequency distribution.

6. The method of claim 1, wherein only radar object localizations that meet at least one of the following criteria are used for the occurrence frequency distribution:
   the radar object localizations are restricted to a distance range;
   the radar object localizations are restricted to an azimuth angle range;
   the elevation angle identified for the respective radar object localization, and/or an azimuth angle identified for the radar object localization, was identified by comparing at least one measured radar signal with at least one stored reference signal having a minimum comparison quality;
   the radar object localizations relate to moving radar targets; and
   the radar object localizations occurred at a vehicle speed of the own vehicle which is not equal to zero.

7. A method for identifying an elevation misalignment angle of a radar sensor of a vehicle, the method comprising:
   identifying, via a control and evaluation device and a radar sensor, elevation angles of radar object localizations with reference to a coordinate system of the radar sensor, wherein an elevation angle of a radar object localization is respectively identified based on radar echoes that are obtained with at least two antenna directional characteristics that differ in an elevation direction; and
   identifying, via an evaluation device, the elevation misalignment angle based on an occurrence frequency distribution of the elevation angles of at least some of the radar object localizations;
   wherein after an identification of the elevation misalignment angle with subsequent identifications of elevation angles of radar object localizations, a correction of the elevation angles as a function of the identified elevation alignment angle is performed, an expected multipath propagation of the radar signals due to reflection from the ground being considered in the correction, and wherein a ground reflection correction value is identified in accordance with a characteristic curve of the correction value as a function of the identified elevation misalignment angle, wherein the ground reflection correction value according to the characteristic curve is capable of assuming several intermediate values between a maximum value and a minimum value, and the extent of the correction of the identified elevation angle is dependent on the ground reflection correction value.

8. A method for identifying an elevation misalignment angle of a radar sensor of a vehicle, the method comprising:

identifying, via a control and evaluation device and a radar sensor, elevation angles of radar object localizations with reference to a coordinate system of the radar sensor, wherein an elevation angle of a radar object localization is respectively identified based on radar echoes that are obtained with at least two antenna directional characteristics that differ in an elevation direction; and identifying, via an evaluation device, the elevation misalignment angle based on an occurrence frequency distribution of the elevation angles of at least some of the radar object localizations;

wherein the radar sensor includes an FMCW radar sensor and has an evaluation device configured to recognize a situation of superimposed radar echoes in one peak of a discrete frequency spectrum, obtained for one frequency ramp, of a baseband signal, and wherein radar object localizations for which the situation of superimposed radar echoes is recognized by the evaluation device are excluded from the occurrence frequency distribution.

9. A radar sensor for identifying an elevation misalignment angle of a radar sensor of a vehicle, comprising:

a control and evaluation device to identify elevation angles of radar object localizations with reference to a coordinate system of the radar sensor, wherein an elevation angle of a radar object localization is respectively identified based on radar echoes that are obtained with at least two antenna directional characteristics that differ in an elevation direction; and an evaluation device to identify the elevation misalignment angle based on an occurrence frequency distribution of the elevation angles of at least some of the radar object localizations; and a multiple-target estimator that is configured to recognize a multiple-target situation and to identify at least two directional angles of a radar echo if the radar echo can be associated with at least two radar objects at different angular positions, and wherein only radar object localizations for which the multiple-target estimator does not recognize a multiple-target situation are used for the occurrence frequency distribution.

\* \* \* \* \*